United States Patent Office.

BENJAMIN STEPHENS, OF WHEELING, WEST VIRGINIA.

*Letters Patent No. 81,838, dated September 1, 1868; antedated April 3, 1868.*

IMPROVED COMPOSITION FOR ROOFING.

The Schedule referred to in these Letters Patent and making part of the same.

TO ALL WHOM IT MAY CONCERN:

Be it known that I, BENJAMIN STEPHENS, of Wheeling, in the county of Ohio, and State of West Virginia, have invented a new and improved Composition for Roofing; and I do hereby declare that the following is a full, clear, and exact description of the construction and operation of the same.

This invention is an improved composition of matter for roofing, which is of such a nature that it will prevent the paper and its coating from cracking, and will form a fire-proof and water-proof covering for the building.

The main ingredients of my improved composition are coal-tar and slag from the boiling-furnaces of rolling-mills.

In preparing and applying my roofing-composition, I use the following process:

I first pulverize the slag by crushing it between rolls, and then run it through a screen to separate from it any impurities. I boil the tar a short time to take out the water from it. I then hoist them to the roof separately, and there mix them to the consistency of mortar, after which, with a scraper prepared for the purpose, I spread the composition upon the common saturated roofing-paper, to the thickness of about one-quarter inch, and while it is yet in a moist condition I sprinkle upon it about one-eighth of an inch of the pulverized slag, in order to absorb all the tar that is yet in solution.

When prepared and applied in this manner, it requires about one hundred and fifty pounds of the pulverized slag, to three gallons of the tar, to cover one hundred square feet of roof. It can be used to cover any form of roof, whether steep or flat, operating to equal advantage on all.

The great merit of this composition lies in the peculiar qualities of the slag, the porous character of which causes a rapid and complete absorption of all the tar, so as to form a hard, compact coating upon the paper, which it is difficult to set on fire, and which is completely water-proof. Another peculiarity of the composition is, that it takes so firm a hold of the paper that the boards on which the latter is laid can contract or expand without cracking or injuring the paper, or the coating of the composition on it, to the slightest degree, thereby avoiding the most universal as well as the worst of all faults in roofing-compounds.

Having thus described my invention, what I claim as new, and desire to secure by Letters Patent, is—

The compound of coal-tar and pulverized slag, as and for the purpose described.

To the above specification of my improvement, I have signed my hand, this 28th day of March, 1868.

BENJAMIN STEPHENS.

Witnesses:
MARK LESTER,
FRED. OLIVER.